United States Patent
Wilms et al.

(10) Patent No.: US 7,281,294 B2
(45) Date of Patent: Oct. 16, 2007

(54) WIPER ARM OF A WIPER APPARATUS FOR WINDOWS OF MOTOR VEHICLES

(75) Inventors: Christian Wilms, Beringen (DE); Eric Windmolders, Kermt (DE)

(73) Assignee: Robert Bosch GmbH (DE)

( * ) Notice: Subject to any disclaimer, the term of this patent is extended or adjusted under 35 U.S.C. 154(b) by 0 days.

(21) Appl. No.: 10/698,219

(22) Filed: Oct. 31, 2003

(65) Prior Publication Data

US 2004/0117938 A1    Jun. 24, 2004

(30) Foreign Application Priority Data

Dec. 20, 2002  (DE) ............................... 102 59 856

(51) Int. Cl.
*B60S 1/34* (2006.01)
*B60S 1/40* (2006.01)

(52) U.S. Cl. ............................... 15/250.351; 15/250.32

(58) Field of Classification Search ........... 15/250.351, 15/250.32, 250.43, 250.44
See application file for complete search history.

(56) References Cited

U.S. PATENT DOCUMENTS

| 1,920,730 | A | | 8/1933 | Wiseman | |
|---|---|---|---|---|---|
| 2,711,553 | A | * | 6/1955 | O'Shei | 15/250.351 |
| 4,343,062 | A | * | 8/1982 | van den Berg | 15/250.32 |
| 5,319,826 | A | | 6/1994 | Mower | |
| 6,449,797 | B1 | | 9/2002 | De Block | |
| 6,553,607 | B1 | * | 4/2003 | De Block | 15/250.32 |
| 6,611,988 | B1 | * | 9/2003 | De Block | 15/250.32 |

FOREIGN PATENT DOCUMENTS

| DE | 24 58 247 | | 6/1976 |
|---|---|---|---|
| DE | 2830508 | * | 1/1980 |
| DE | 19924662 | * | 11/2000 |
| FR | 2 076 733 | | 10/1971 |
| FR | 2 584 036 | | 1/1987 |
| KR | 1020020072622 | * | 9/2002 |
| NL | 1017344 | * | 8/2002 |
| WO | WO 2004/002792 | | 1/2004 |

* cited by examiner

*Primary Examiner*—Gary K. Graham
(74) *Attorney, Agent, or Firm*—Michael Best & Friedrich

(57) ABSTRACT

The invention relates to an articulated wiper arm of a wiper apparatus for windows of motor vehicles with a device for a detachable connection to a pivoted wiper blade on one free end, in particular for connection to a non-articulated wiper blade, which includes at least one articulated bolt.

Figure 1:
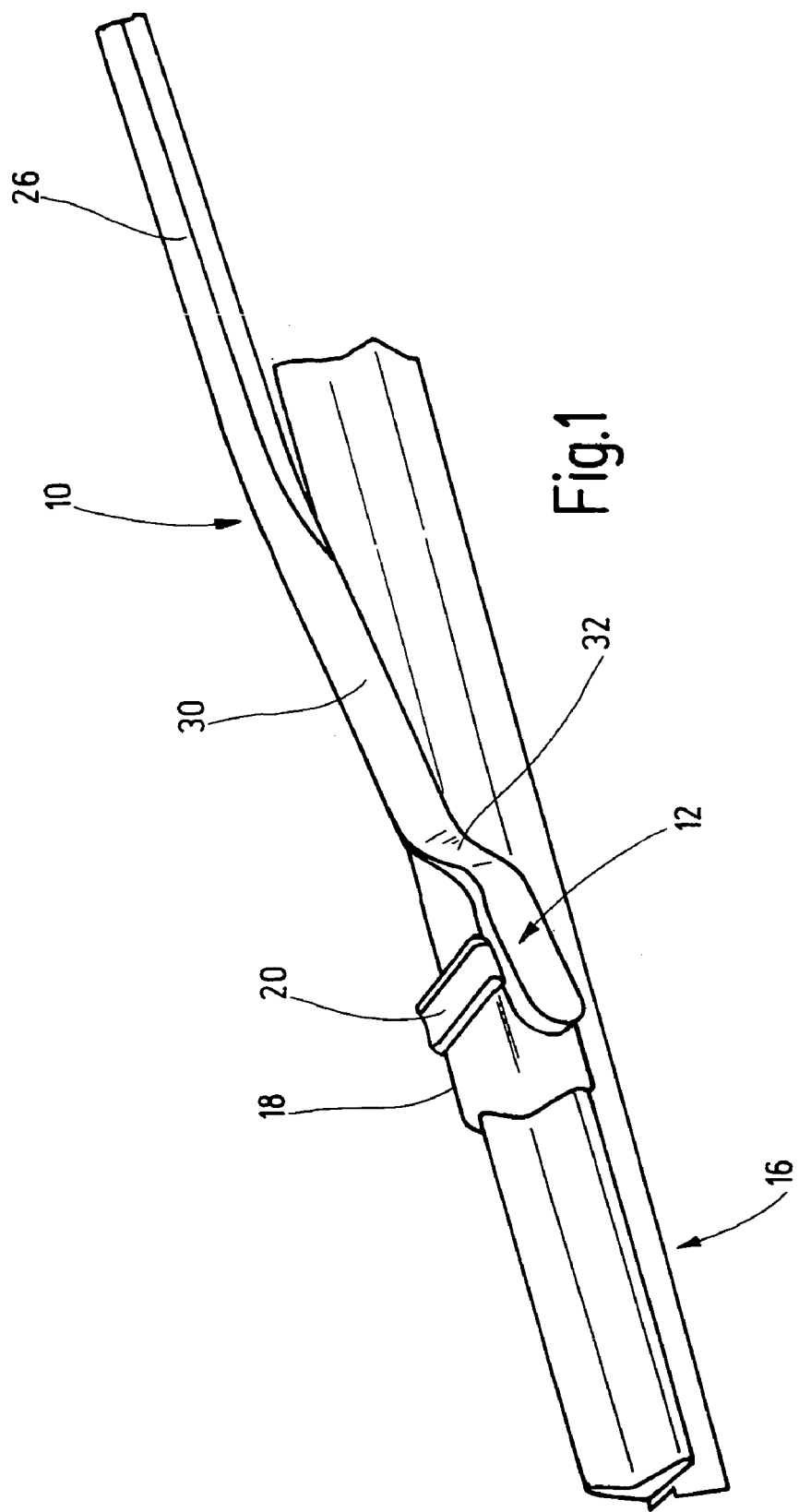

It is planned that the device for connection to the wiper blade (16) is embodied as a single piece with the wiper arm (10).

17 Claims, 5 Drawing Sheets

WIPER ARM OF A WIPER APPARATUS FOR WINDOWS OF MOTOR VEHICLES

The invention relates to a wiper arm of a wiper apparatus for windows of motor vehicles.

STATE OF THE ART

Various designs of wiper blades for windows of motor vehicles are known. Non-articulated wiper blades are typically comprised of a wiper strip, which is reinforced by means of one or two spring rails and features a wiper lip that can be placed on the window. The wiper blade can be detachably affixed to a swivelable wiper arm of the motor vehicle approximately in the center by means of an adapter or a coupling part. In this connection, known embodiments of the wiper arm feature an adapter section on one end on which a pin is located that can be inserted into a bushing of the coupling part and which makes a swiveling movement around the center axis of the pin possible. In this case, a securing bow partially grips around the wiper blade and provides for delimiting the swivel angle as well as for fixing the wiper blade in an operating position.

ADVANTAGES OF THE INVENTION

The swivelable wiper arm of a wiper apparatus in accordance with the invention for windows of motor vehicles features a free end with a device for detachable connections to a pivoted wiper blade. This device includes at least one articulated bolt and can be used in particular for connection to a non-articulated wiper blade. The invention provides for the device for connection to the wiper blade to be embodied as a single piece with the wiper arm. In particular, the articulated bolt can be glued, welded, pressed or otherwise connected to the wiper arm resulting in a wiper arm that is structured very simply on which a wiper blade, particularly a non-articulated wiper blade, can be attached in a simple manner.

In addition, the device for connection to the wiper blade can feature a safety hook partially gripping around this wiper blade, which results in the wiper blade being anchored firmly on the wiper arm in an operating position, in which the longitudinal extending devices of the wiper blade and wiper arm are aligned approximately parallel to one another. Even the safety hook can be embodied in an advantageous manner as a single piece with the wiper arm. In particular, it can be glued, welded or pressed to the wiper arm.

An alternative embodiment of the invention provides for a safety hook that is formed of a bent section of the free end of the wiper arm. In this case, the wiper arm that is composed of a flat band made of steel or the like can be bent on its end into a safety hook so that it does not have to be additionally attached. Such a wiper arm can be manufactured simply and cost effectively.

According to a preferred embodiment of the invention, the wiper arm is formed of a flat material that is twisted around its longitudinal axis in sections so that a carrying section is aligned with its flat side parallel to the window. The free end is twisted in such a way that the articulated bolt can project out of the flat side of the flat material. In particular, the free end with the articulated bolt can be twisted around its longitudinal axis by approximately 90 degrees vis-à-vis a carrying area near a swivel support of the wiper arm.

A connecting section between the carrying area and the free end is twisted vis-à-vis this by 25 to 65 degrees, preferably by approximately 45 degrees, around its longitudinal axis. On the one hand, this provides a suitable basis for forming the device to connect to the wiper blade in which the articulated bolt and the safety hook can be anchored. In addition, the carrying area has the desired rigidity in the swiveling direction and adequate flexibility with respect to the window surface so that the wiper arm can adapt to said window.

As an alternative to the wiper arm that is twisted in sections, the wiper arm can also be composed of a non-twisted flat material. In this case, the articulated bolt preferably projects out of a flat side on the free end of the wiper arm. In this embodiment, the wiper arm can be completely straight or bent slightly.

An alternative embodiment of the wiper arm in accordance with the invention provides for the device for connection to the wiper blade to feature a covering instead of a safety hook, which partially grips around the wiper blade in a position where it is locked with the wiper arm and provides for its locking. The covering can be attached and removed by means of a locking connection.

The wiper arm in accordance with the invention provides for locking the wiper blade in the operating position and restricting the swivel range vis-à-vis the wiper arm. The wiper arm is structured very simply and provides all known and required functions of a conventional wiper arm also for a connection to a non-articulated wiper blade, which only must have a connection area with a bushing to accommodate the swivel bolt.

Additional advantageous embodiments of the invention are yielded from the remaining features cited in the dependent claims.

DRAWINGS

The invention is explained in more detail in the following in preferred exemplary embodiments based on the associated drawings. They show:

FIG. 1 A perspective representation of a first variation of a wiper arm with a wiper blade fastened to it.

Figure 2:
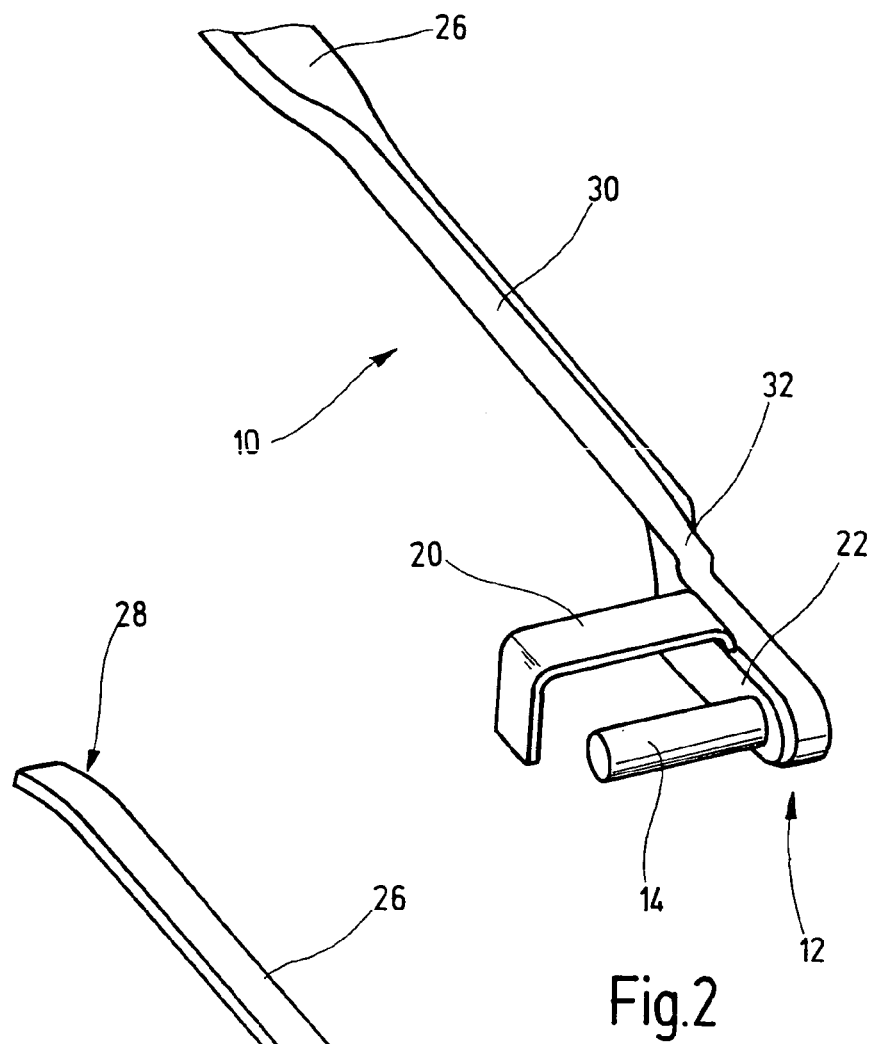

FIG. 2 A schematic perspective representation of the wiper arm according to FIG. 1.

Figure 3:
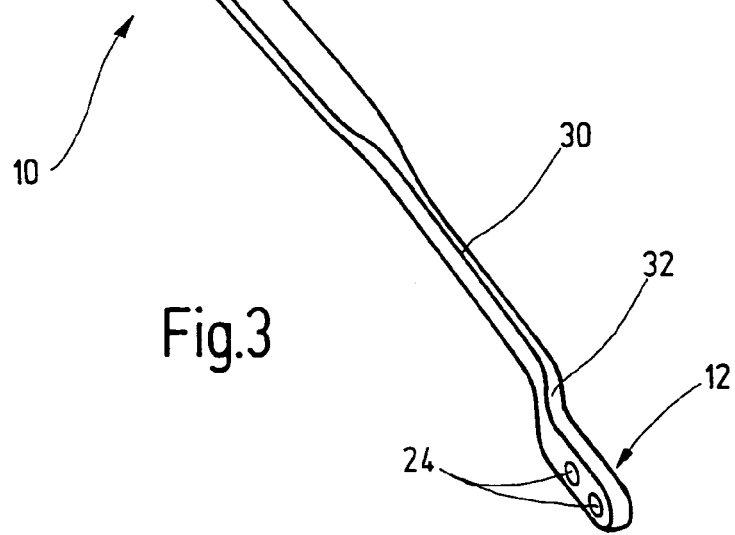

FIG. 3 A schematic perspective representation of the wiper arm according to FIG. 1 without an articulated bolt and safety hook arranged on it.

Figure 4A:
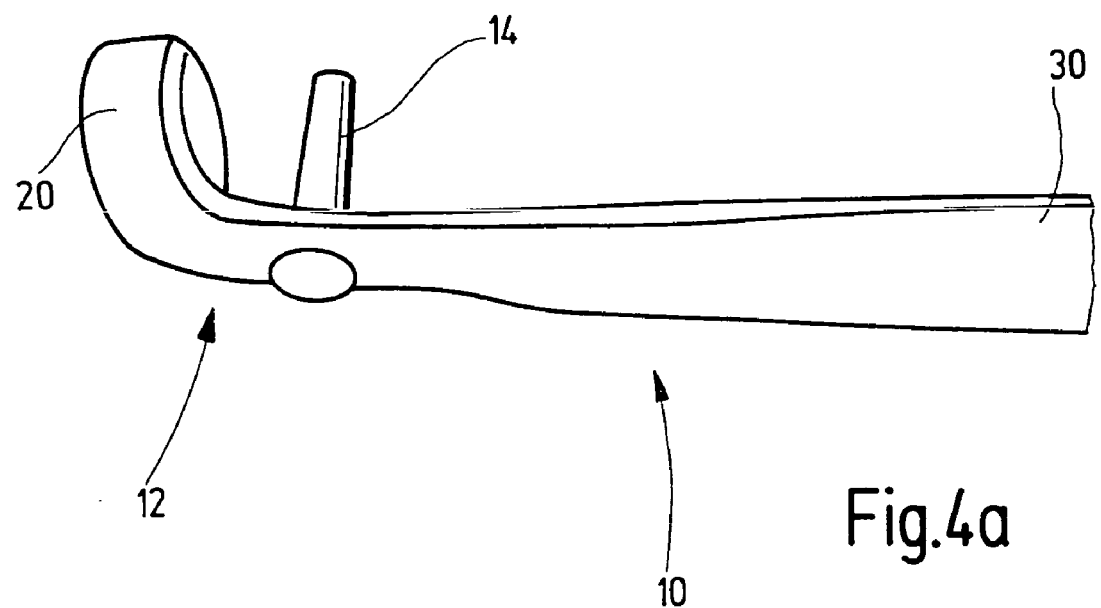
Figure 4B:
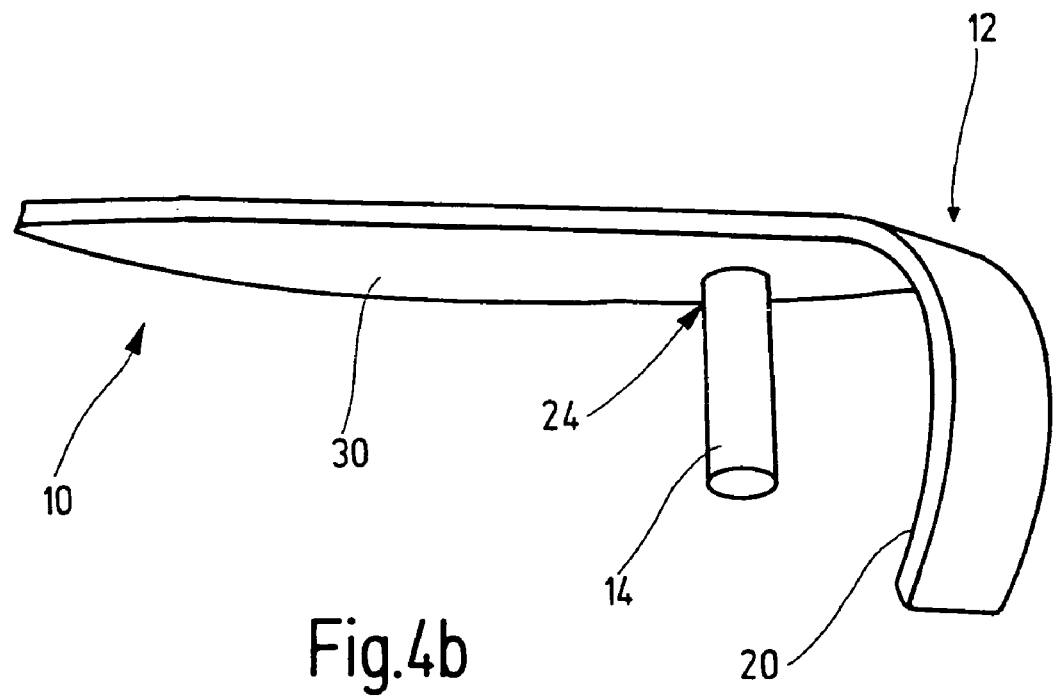

FIGS. 4a and 4b Schematic detailed views of an alternative variation of a wiper arm in accordance with the invention.

Figure 5:
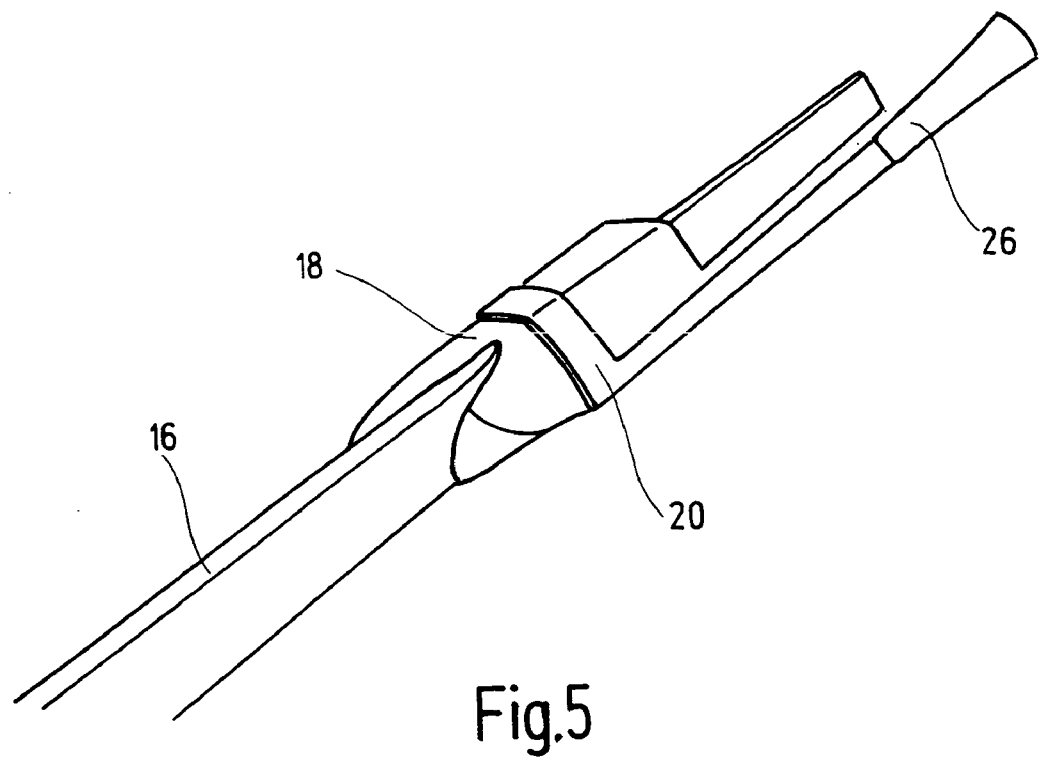

FIG. 5 A perspective representation of a second variation of a wiper arm with a wiper blade fastened to it.

Figure 6:
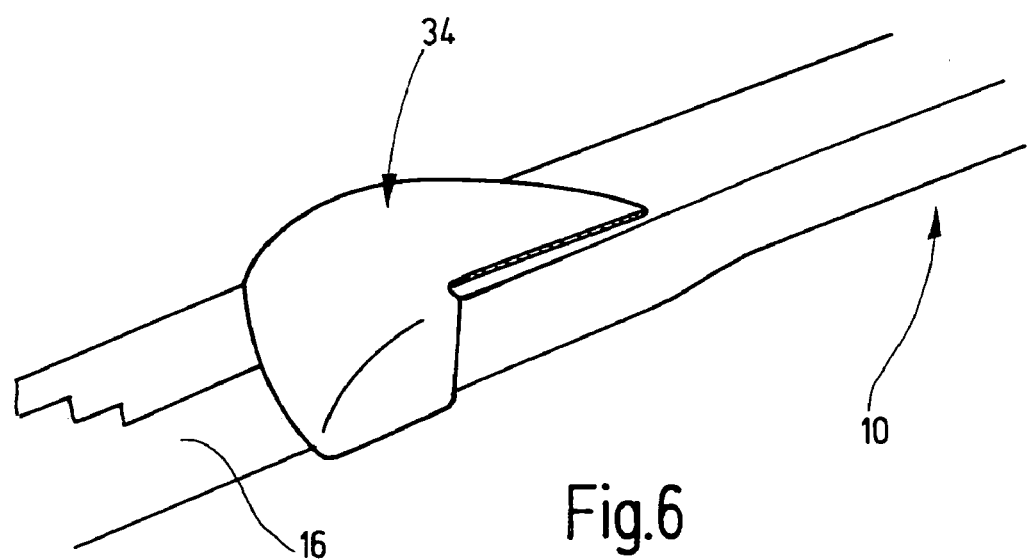

FIG. 6 A perspective detailed view of a third variation of a wiper arm with a wiper blade fastened to it.

Figure 7:
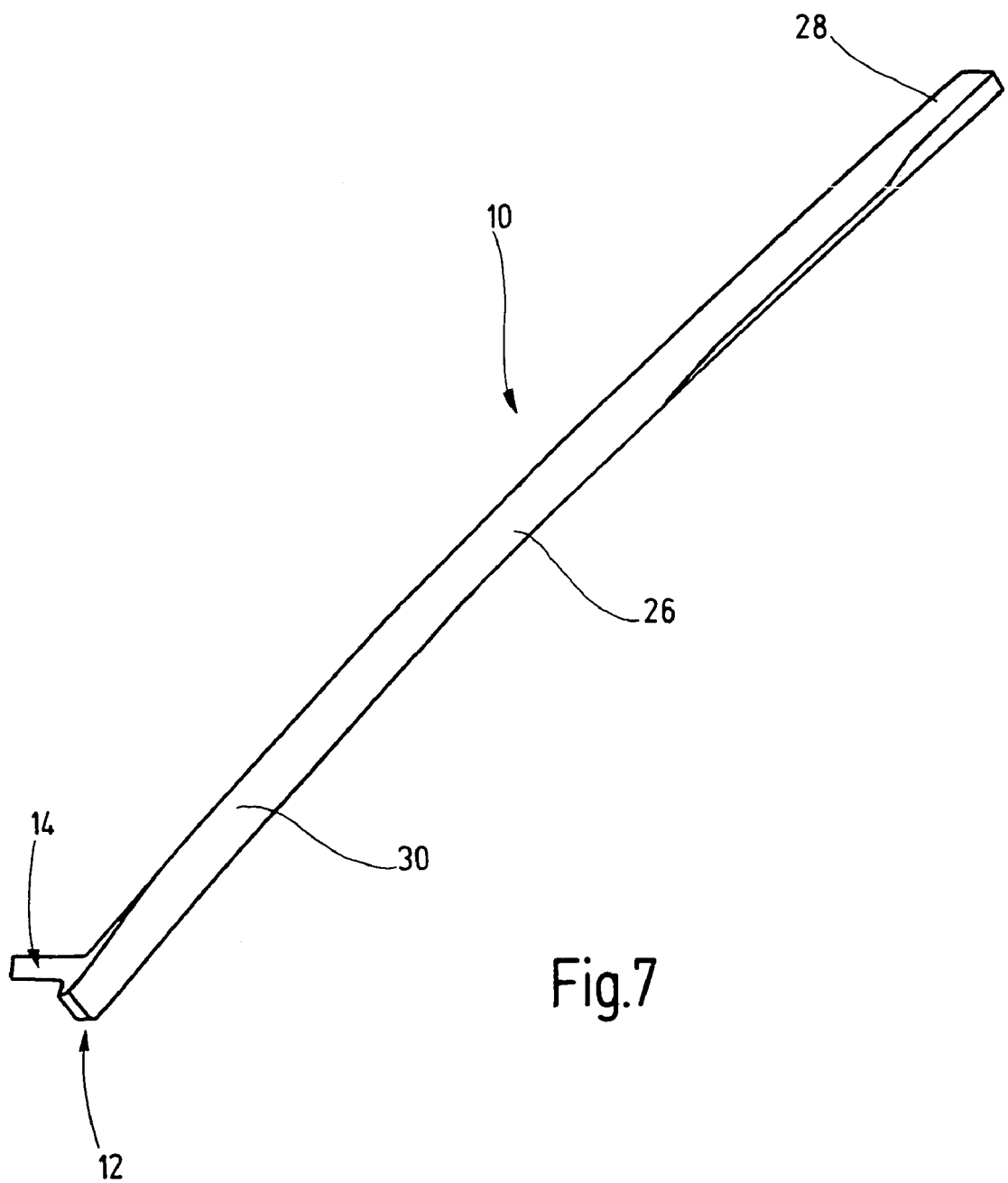

FIG. 7 A schematic perspective representation of the wiper arm according to FIG. 6.

DESCRIPTION OF THE EXEMPLARY EMBODIMENTS

A first variation of a wiper arm 10 in accordance with the invention is illustrated on the basis of FIGS. 1 through 3. In the exemplary embodiment shown, the wiper arm 10 is comprised of a band material, for example a steel band or a fiber-reinforced plastic material. Arranged on one free end 12 is an articulated bolt 14 for the articulated connection to a coupling element 18 of a non-articulated wiper blade 16. A safety hook 20 that is spaced at a slight distance from and parallel to the articulated bolt 14 is used to lock the plug-in connection between the articulated bolt 14 and the coupling element 18 in the wiper blade's 16 operating position when it is aligned approximately parallel to the wiper arm 10 (see FIG. 1).

The articulated bolt 14 and the safety hook 20 are preferably embodied as a single piece with the wiper arm 10 and can be glued, welded, pressed or otherwise connected to it, for example. The articulated bolt 14 and the safety hook 20 can be fastened in particular to a plate 22, which can be connected in the described manner to the free end 12 of the wiper arm 10. In particular, the safety hook 20 can be bent out of a part of the plate 22. A short section of the articulated bolt preferably projects through the side of the disk 22 adjacent to the wiper arm 10 and can be pressed into a receptacle 24 when connecting the plate 22 to the wiper arm 10. Another receptacle 24 can be used to accommodate a projection on the plate 22 and provide for better positioning of the plate.

In the depicted exemplary embodiment, the free end 12 of the wiper arm 10 is twisted by approx. 90 degrees vis-à-vis a carrying area 26, which features a swivel support 28 on the other end. A connecting section 30 conforming closely to the wiper blade 16 is situated between the carrying area 26 and the free end with an attached articulated bolt 14 and is twisted vis-à-vis these by approx. 45 degrees. The transition between the connecting section 30 and the free end 12 can also feature a right angle bend 32 thereby minimizing an effective lever arm of the suspension of the wiper blade 16 vis-à-vis a longitudinal axis of the wiper arm 10.

As an alternative to this, the connecting section can be also omitted with the wiper arm 10 being composed over its entire length of a non-twisted flat material. In this case, the articulated bolt 14 projects out of a flat side on the free end 12.

This first variation of the wiper arm 10 is structured very simply and can be manufactured very cost effectively. Mounting the wiper blade 16 can be accomplished very quickly by the wiper arm 10 being lifted from the window, the wiper blade 16 being slid onto the articulated bolt 14 for example in a position that is swiveled by 90 degrees and then swiveled into the operating position. In doing so, the safety hook 20 grips around the coupling element 18 and prevents the wiper blade 16 from being pulled off of the wiper arm 10. At the same time the safety hook 20 represents an angular limit stop.

FIGS. 4a, 4b and 5 illustrate a second variation of the wiper arm 10 in accordance with the invention, whose free end 12 is bent around so that it forms a safety hook 20 to grip around the wiper blade 16. In this case, the flat material of the wiper arm 10 is twisted and bent in such a way that a safety hook 20 projecting by 90 degrees to the longitudinal direction and describing a lateral curve is formed. The articulated bolt 14 can be impressed or pressed or even be glued or welded into receptacle 24 in the vicinity of the safety hook 20. This articulated bolt 14 is used in turn to attach a correspondingly embodied wiper blade 16 whose coupling element 18 is preferably adapted to the semicircular contour of the safety hook 20 (see FIG. 5).

Also in the case of this variation, the wiper arm 10 can be twisted in the same manner as in the first variation according to FIGS. 1 through 3.

Finally, FIGS. 6 and 7 show a third variation of the wiper arm 10 in accordance with the invention. The wiper arm's free end 12, which is preferably twisted in the same manner as in the first and second variations, features only an articulated bolt 14, but not a safety hook. Instead its function is fulfilled by a covering 34 in the form of a cap that can be locked with the wiper arm.

FIG. 7 shows the wiper arm 10 with the articulated bolt 14 projecting perpendicularly from its free end 12. FIG. 6 shows the wiper arm 10 connected to a wiper blade 16 in accordance with the third variation. The covering 34 grips around the free end 12 of the wiper arm 10 as well as a portion of the coupling element of the wiper blade and provides for it to be locked in the operating position. If the wiper blade 16 should be pulled off of the articulated bolt 14, the engaged cap 34 will be removed first. Then the wiper blade 16 can be removed from the wiper arm 10.

The three depicted variations of the wiper arm 10 in accordance with the invention are distinguished by a simple structure and cost-effective manufacturability. The non-articulated wiper blade 16 can be mounted in a simple manner and removed again without any tools being required for assistance. Locking into the operating position adjacent to the vehicle window is very reliable because of the safety hook 20 or the covering cap 34 so that the wiper blade 16 cannot slip off or be pulled off inadvertently.

The invention claimed is:

1. Articulated wiper arm of a wiper apparatus for windows of motor vehicles, having a free end and a non-free end opposite the free end, the free end of the articulated wiper arm being a single, substantially flat layer of material and having a device for detachably and pivotably connecting to a wiper blade, in particular for connecting to a non-articulated wiper blade, the device for connecting to the wiper blade being fixed to the wiper arm and comprising an articulating bolt for pivotably carrying the wiper blade, and a safety hook for partially gripping around the wiper blade in an operating position thereof, wherein the safety hook is a bent section of the single layer defining the free end of the wiper arm, and extending to a terminus of the wiper arm, and the articulating bolt is located between the safety hook and the non-free end of the articulated wiper arm; and wherein the articulating bolt extends from the single layer of the wiper arm.

2. A wiper arm according to claim 1 wherein the articulating bolt is glued, welded or pressed to the wiper arm.

3. A wiper arm according to claim 1 wherein the wiper arm is formed of a flat material that is twisted around its longitudinal axis in sections.

4. A wiper arm according to 1 wherein the free end with the articulating bolt is twisted around its longitudinal axis by an angle between 0 degrees and 90 degrees vis-à-vis a carrying area near a swivel support of the wiper arm.

5. A wiper arm according to claim 1 wherein the free end with the articulating bolt is twisted around its longitudinal axis by approximately 90 degrees vis-à-vis a carrying area near a swivel support of the wiper arm.

6. A wiper arm according to claim 1 wherein a connecting section between a carrying area and the free end has a longitudinal axis and is twisted vis-à-vis the carrying area and the free end and around the longitudinal axis by an angle of between 0 degrees and 90 degrees.

7. A wiper arm according to claim 1 wherein a connecting section between a carrying area and the free end has a longitudinal axis and is twisted vis-à-vis the carrying area and the free end and around the longitudinal axis by approximately 45 degrees.

8. A wiper arm according to claim 1 wherein in an operating position, the wiper blade is locked on the wiper arm and is restricted in terms of its swivel range vis-à-vis said wiper arm.

9. A windshield wiper assembly comprising:
an articulated wiper arm having a free end the free end being a single, substantially flat layer of material and a non-free end opposite the free end;
a wiper blade; and
a device for detachably and pivotably connecting the wiper arm and the wiper blade, the device being fixed to the wiper arm and including an articulating bolt pivotably carrying the wiper blade, and a safety hook partially gripping around the wiper blade in an operating position thereof, the safety hook being a bent section of the single layer defining the free end of the wiper arm, and extending to a terminus of the wiper arm
wherein the articulating bolt is located between the safety hook and the non-free end of the articulated wiper arm; and
wherein the articulating bolt extends from the single layer of the wiper arm.

10. The assembly of claim 9 wherein the safety hook is longer than the articulating bolt.

11. The assembly of claim 9 wherein the articulating bolt is glued, welded or pressed to the wiper arm.

12. The assembly of claim 9 wherein the wiper arm is formed of a flat material that is twisted around its longitudinal axis in sections.

13. The assembly of claim 9 wherein the free end with the articulating bolt is twisted around its longitudinal axis by an angle between 0 degrees and 90 degrees vis-à-vis a carrying area near a swivel support of the wiper arm.

14. The assembly of claim 9 wherein the free end with the articulating bolt is twisted around its longitudinal axis by approximately 90 degrees vis-à-vis a carrying area near a swivel support of the wiper arm.

15. The assembly of claim 9 wherein a connecting section between a carrying area and the free end has a longitudinal axis and is twisted vis-à-vis the carrying area and the free end and around the longitudinal axis by an angle of between 0 degrees and 90 degrees.

16. The assembly of claim 9 wherein a connecting section between a carrying area and the free end has a longitudinal axis and is twisted vis-à-vis the carrying area and the free end and around the longitudinal axis by approximately 45 degrees.

17. The assembly of claim 9 wherein in an operating position, the wiper blade is locked on the wiper arm and is restricted in terms of its swivel range vis-à-vis said wiper arm.

* * * * *